United States Patent [19]

Deglis

[11] Patent Number: 5,168,830
[45] Date of Patent: Dec. 8, 1992

[54] METHOD AND APPARATUS FOR VIEWING AND LISTENING TO BIRDS

[76] Inventor: Janis Deglis, 612 North St., Feeding Hills, Mass. 01030

[21] Appl. No.: 693,327

[22] Filed: Apr. 29, 1991

[51] Int. Cl.⁵ .................... A01K 31/00; A01K 39/01
[52] U.S. Cl. .................................. 119/23; 119/52.2; 119/57.8
[58] Field of Search ................ 119/23, 52.2, 52.3, 119/57.8, 57.9, 51.01, 29; 340/565, 566, 573; 434/308, 319

[56] References Cited

U.S. PATENT DOCUMENTS

| | | | |
|---|---|---|---|
| 2,344,367 | 3/1944 | Pueschel | 119/52.3 |
| 3,673,567 | 6/1972 | McClellan, Sr. | 119/29 |
| 3,792,685 | 2/1974 | Wiener | 119/23 |
| 3,847,120 | 11/1974 | Hicks | 119/29 |
| 4,250,499 | 2/1981 | Kienzle | 340/566 |
| 4,651,678 | 3/1987 | Kime | 119/29 |

FOREIGN PATENT DOCUMENTS

| | | | |
|---|---|---|---|
| 3728591 | 3/1989 | Fed. Rep. of Germany | 119/17 |
| 2571219 | 4/1986 | France | 119/29 |

Primary Examiner—Robert P. Swiatek
Assistant Examiner—Todd E. Manahan
Attorney, Agent, or Firm—Paul G. Lunn

[57] ABSTRACT

The present invention is an improved birdhouse or birdfeeder having a microphone attached to the birdhouse or birdfeeder. The birdhouse or birdfeeder attracts birds. The birds sing and make other sounds. The microphone picks up the sounds and songs of the birds and transmits them to a receiver. The birdsongs can then be heard through one or more speakers attached to the receiver, thereby, allowing one to view and hear the birds simultaneously.

8 Claims, 3 Drawing Sheets

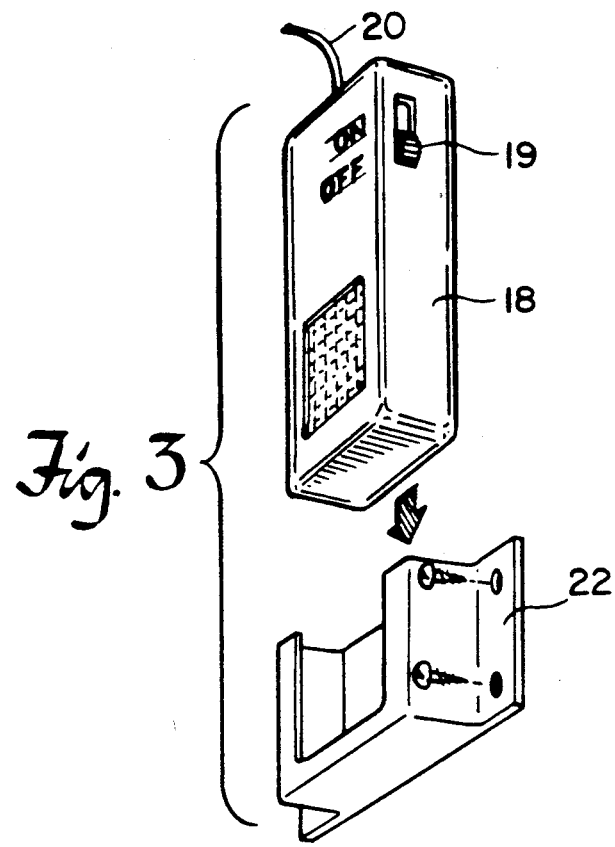
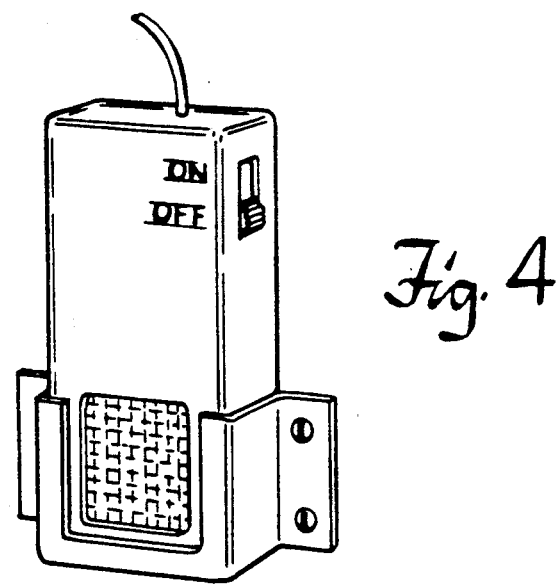

METHOD AND APPARATUS FOR VIEWING AND LISTENING TO BIRDS

BACKGROUND OF THE INVENTION

Outdoor birdhouses and birdfeeders are very popular. They are placed outside to attract birds both for viewing and for insect control. In spite of the fact that the birds can be seen, they more than likely cannot be heard. If the birdhouse or birdfeeder is placed too close to a house, then many species of birds may be scared away due to the proximity of humans.

It is therefore, an object of the present invention to develop a birdhouse and bird feeder which attract birds so that the birds can be seen and heard.

It is a further object of the present invention to provide a method for attracting birds and listening to them from the comfort of one's home.

SUMMARY OF THE INVENTION

The present invention is a method for providing viewing and the enjoyment of listening to birds comprised of placing birdfeed into a birdfeeder; setting the birdfeeder up outdoors; attaching a microphone onto the birdfeeder such that the microphone can transmit sound to a amplifier or radio receiver such that sounds made by the birds at the birdfeeder can be heard through one or more speakers attached to the birdfeeder.

In another embodiment of the present invention a microphone is placed onto a birdhouse such that the microphone can transmit sound from birds at the birdhouse to an amplifier or radio receiver, said sounds then being heard through one or more speakers attached to the receiver or amplifier.

The present invention is also directed toward a birdhouse or birdfeeder which has a microphone attached onto the birdhouse or birdfeeder such that bird sounds can be picked up by the microphone and transmitted to a receiver or amplifier and the bird sounds can be heard through one or more speakers attached to the receiver or amplifier.

Preferably, the microphone which is used in the above-described embodiments of the present invention is a wireless microphone capable of transmitting a radio signal to a receiver such that the sounds made by the birds can be heard through speakers attached to the receiver.

In this manner the songs of birds can be heard within the comfort of one's home; they can be listened to from greater distances and the birds can be identified by song as well as sight. In addition the present invention provides a method for alerting the birdwatcher to activity at the birdhouse or birdfeeder without having to sit and visually wait and look for activity.

BRIEF DESCRIPTION OF THE DRAWINGS

FIG. 3 shows a wireless microphone sliding into a microphone holder.

FIG. 4 shows the wireless microphone in the microphone holder.

DETAILED DESCRIPTION OF THE INVENTION

Figure 1:
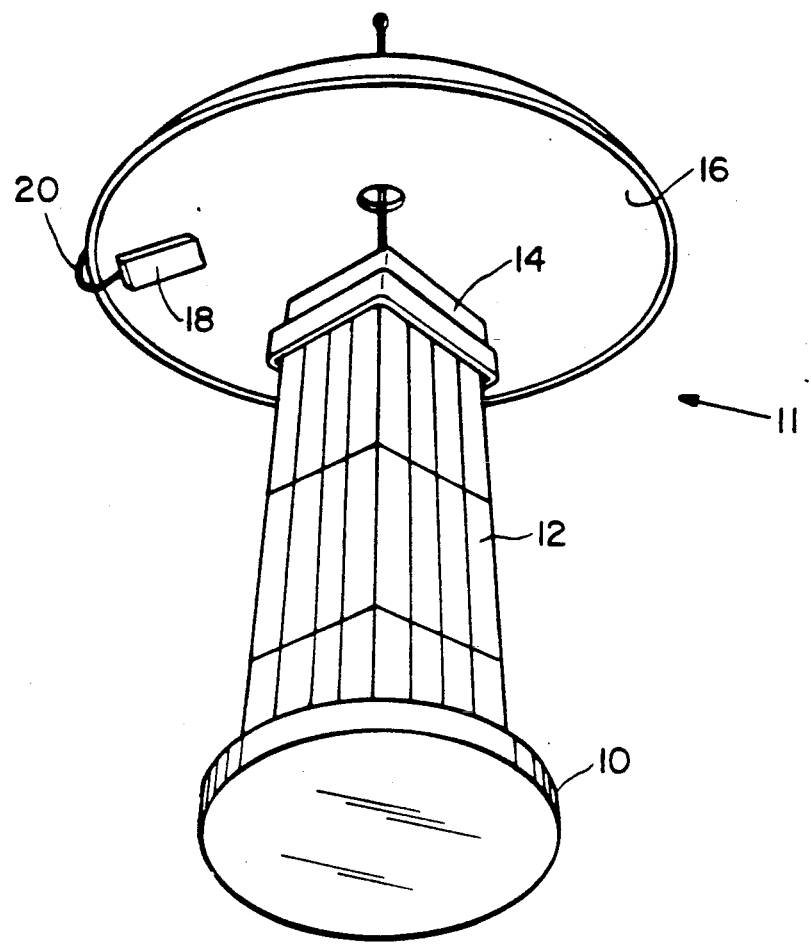
FIG. 1 shows a birdfeeder having a wireless microphone attached to the hood of the birdfeeder.

The birdfeeder 11 depicted in FIG. 1 is comprised of a bottom tray 10, a body 12, a top 14 and a hood 16. To place birdfeed into the birdfeeder the top of the birdfeeder is removed and birdfeed is poured through the center of body 12 and it falls into tray 10 so birds can feed therefrom.

Figure 2:
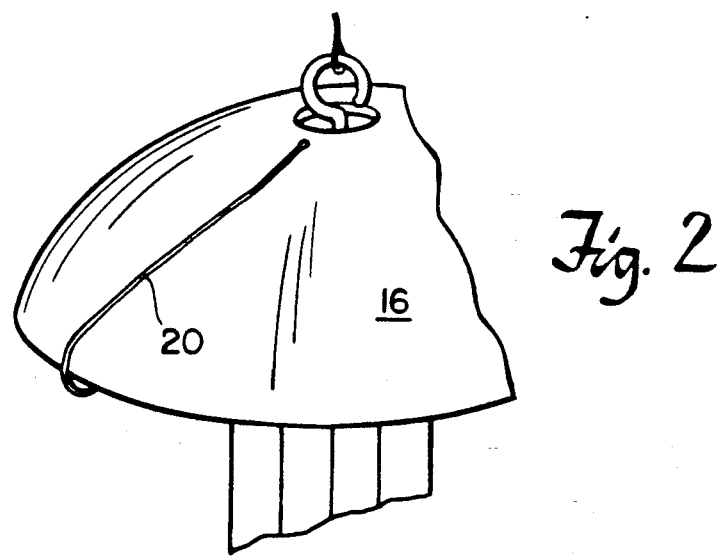
FIG. 2 shows the antenna of the wireless microphone attached to the top of the hood of the birdfeeder.

A wireless microphone 18 is attached to the bottom of hood 16. An antenna 20 extends from microphone 18 to the top of the hood 16 as is shown in FIG. 2. FIGS. 3 and 4 show how microphone 18 can be secured onto the birdfeeder by holder 22. An example of a suitable wireless microphone is a REALISTIC ® FM wireless microphone by Radio Shack.

Figure 5:
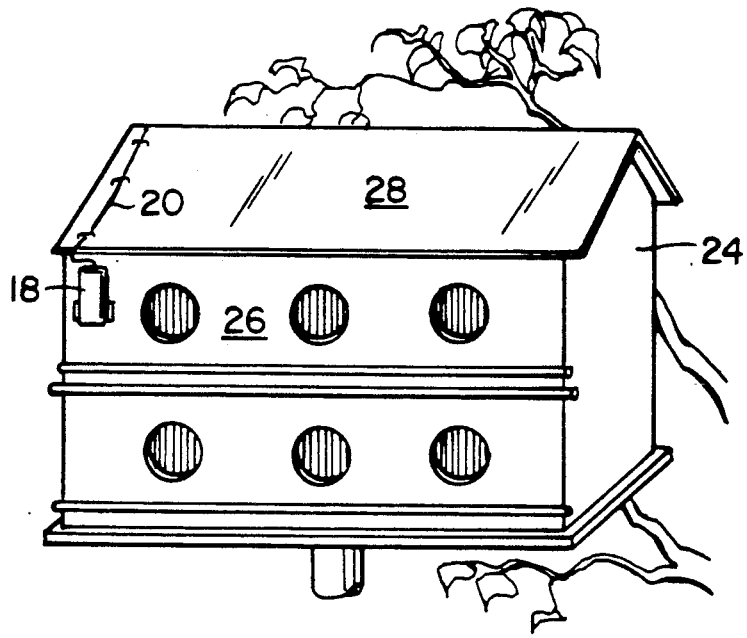
FIG. 5 shows a wireless microphone attached to a birdhouse.
Figure 6:
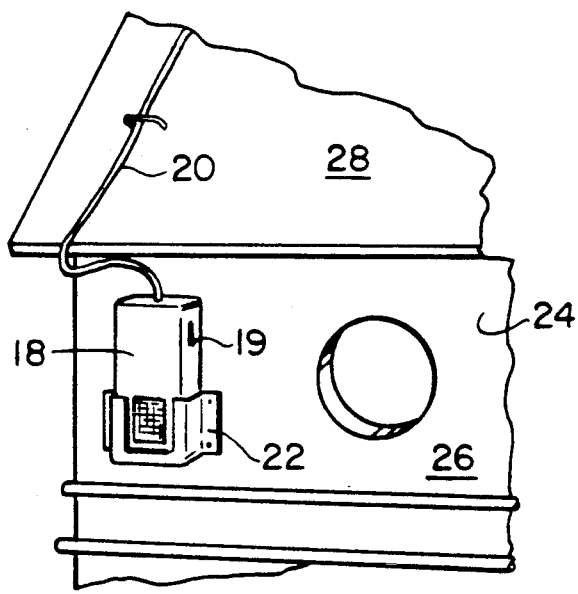
FIG. 6 is a close-up of a wireless microphone attached to a birdhouse.

FIGS. 5 and 6 show a wireless microphone attached to a birdhouse 24. As can be seen in FIG. 6, holder 22 is screwed onto side 26 of birdhouse 24 and microphone 18 is placed within holder 22 beneath roof 28 which extends over and is attached to side 24. Antenna 20 extends from microphone 18 and attaches onto roof 28 of birdhouse 24.

Figure 7:
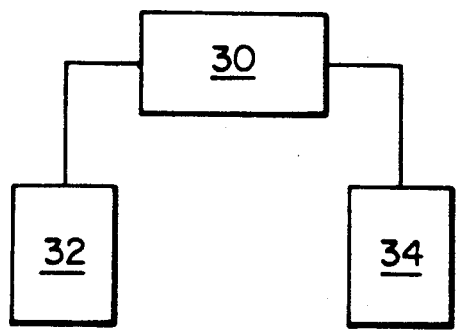
FIG. 7 shows a stereo receiver and two speakers.

FIG. 7 shows a stereo radio receiver 30 connected to two speakers 32 & 34. So according to the present invention, a homeowner having a yard will attach a birdfeeder to a tree. A wireless radio transmitter microphone is attached to the hood 16 of the birdfeeder. The owner had previously filled the birdfeeder with birdseed. Inside the house is stereo receiver 30. The owner had previously selected a free FM band on the stereo receiver and then tuned the wireless microphone so it transmits on the selected free band according to the manufacturer's directions. The switch 19 of the microphone 18 was then turned on and the stereo was turned on. The birdseed within the birdfeeder 11 attracts the birds, the birds sing their songs and the wireless microphone 18 transmitts the songs from the birdfeeder to the stereo 30. The owner hears the songs through the speakers 32 and 34 which alerts him that birds are at the birdfeeder which allows him to watch the birds and listen to them simultaneously.

EQUIVALENTS

Those skilled in the art will recognize, or be able to ascertain using no more that routine experimentation, many equivalents to the specific embodiments of the invention described herein. Such equivalents are intended to be encompassed by the following claims. In addition the present invention provides a method for alerting the birdwatcher to activity at the birdhouse or birdfeeder without having to sit and visually wait and look for activity.

I claim:

1. A process for simultaneously viewing and listening to birds comprising:
   a) placing birdfeed into a birdfeeder to attract birds, said birdfeeder being comprised of a body into which the birdfeed is placed, and a hood extending over the top of the body of the birdfeeder;
   b) setting the birdfeeder up outdoors; and
   c) attaching a microphone onto the birdfeeder such that the microphone is beneath the hood of the birdfeeder, and such that the microphone transmits sound made by the birds to an amplifier or radio receiver said sounds then being heard over one or more speakers attached to a receiver.

2. A process as recited in claim 1 wherein the microphone is a radio transmitter such that the microphone transmits the sound of the birds by means of radio waves to a radio receiver.

3. A process for simultaneously viewing and listening to birds comprising:
   a) setting up a birdhouse outdoors in order to attract birds to the birdhouse, said birdhouse being comprised of sidewalls, and a roof attached to and extending over the sidewalls of the birdhouse; and
   b) attaching a microphone to the sidewalls of the birdhouse such that the microphone is beneath the roof of the birdhouse and such that the microphone transmits sounds made by the birds to a receiver such that the sounds made by the birds at the birdhouse can be heard from one or more speakers attached to the receiver.

4. A process as recited in claim 3, wherein the microphone is a radio transmitter such that the microphone transmits the sound of the birds by means of radio waves to a radio receiver.

5. A birdfeeder, said birdfeeder being comprised of a body into which the birdfeed is placed, and a hood extending over the top of the body of the birdfeeder: the improvement being comprised of a microphone attached to said birdfeeder such that the microphone is beneath the hood of the birdfeeder, and such that sounds made by birds at the birdfeeder are transmitted to a receiver said sounds being then heard through one or more speakers attached to the receiver.

6. A birdfeeder as recited in claim 5, wherein the microphone is a radio transmitter such that the microphone transmits the sound of the birds by means of radio waves to a radio receiver.

7. A birdhouse, the improvement being comprised of a microphone attached to a side of said birdhouse such that the microphone is beneath a roof attached to and extending over said side of said birdhouse, such that sounds made by birds at the birdhouse are transmitted to a receiver said sounds being then heard through one or more speakers attached to the receiver.

8. A birdhouse as recited in claim 7, wherein the microphone is a radio transmitter such that the microphone transmits the sound of the birds by means of radio waves to a radio receiver.

* * * * *